United States Patent
Kondo

(10) Patent No.: US 10,034,004 B2
(45) Date of Patent: Jul. 24, 2018

(54) RECEIVING APPARATUS, TRANSMITTING APPARATUS, AND IMAGE TRANSMITTING METHOD

(71) Applicant: I-CUBED RESEARCH CENTER INC., Tokyo (JP)

(72) Inventor: Tetsujiro Kondo, Tokyo (JP)

(73) Assignee: I-CUBED RESEARCH CENTER INC., Tokyo (JP)

( * ) Notice: Subject to any disclaimer, the term of this patent is extended or adjusted under 35 U.S.C. 154(b) by 0 days.

(21) Appl. No.: 14/422,809

(22) PCT Filed: Aug. 21, 2013

(86) PCT No.: PCT/JP2013/072267
§ 371 (c)(1),
(2) Date: Feb. 20, 2015

(87) PCT Pub. No.: WO2014/030665
PCT Pub. Date: Feb. 27, 2014

(65) Prior Publication Data
US 2015/0245039 A1 Aug. 27, 2015

(30) Foreign Application Priority Data
Aug. 24, 2012 (JP) ................................. 2012-184921

(51) Int. Cl.
*H04N 7/173* (2011.01)
*H04N 19/174* (2014.01)
(Continued)

(52) U.S. Cl.
CPC ........... *H04N 19/174* (2014.11); *H04N 19/44* (2014.11); *H04N 19/59* (2014.11); *H04N 19/85* (2014.11); *H04N 19/94* (2014.11); *H04N 19/98* (2014.11)

(58) Field of Classification Search
CPC ... A61B 1/015; A61B 1/0615; A61B 1/00096; A61B 1/0011; A61B 1/051;
(Continued)

(56) References Cited

U.S. PATENT DOCUMENTS 6,353,930 B1 * 3/2002 Shimoji ................. H04H 20/93
348/E5.108
7,149,436 B2 * 12/2006 Sugiura .............. G03G 15/5087
399/8

(Continued)

FOREIGN PATENT DOCUMENTS

JP 62-102685 5/1987
JP H05-167992 7/1993
(Continued)

OTHER PUBLICATIONS

Extended European Search Report dated Feb. 23, 2016, issued in corresponding European Application No. 13830282.3.
(Continued)

*Primary Examiner* — Mohammed Rahaman
*Assistant Examiner* — Kehinde O Abimbola
(74) *Attorney, Agent, or Firm* — Troutman Sanders LLP

(57) ABSTRACT

A transmitting apparatus includes: an image accepting unit that accepts a first image; a transmission-side correspondence table storage unit in which a transmission-side correspondence table is stored, the transmission-side correspondence table having multiple pieces of transmission-side correspondence information for associating a first image block with a second image block; a preprocessing unit that acquires one or more blocks from the first image, acquires one or more second image blocks respectively corresponding to the one or more blocks, and constructs a second image from the one or more second image blocks; and a transmitting unit that transmits the second image.

13 Claims, 10 Drawing Sheets

(51) Int. Cl.
*H04N 19/94* (2014.01)
*H04N 19/44* (2014.01)
*H04N 19/85* (2014.01)
*H04N 19/59* (2014.01)
*H04N 19/98* (2014.01)

(58) Field of Classification Search
CPC .............. A61B 1/0684; G01S 7/52063; G01S 7/52085; G01S 15/8979; H04N 2005/2255; H04N 5/23293; H04N 7/15; H04N 13/0438; H04N 21/4223; H04N 19/164; H04N 19/30; H04N 19/17; H04N 19/61; H04N 19/90; H04N 21/235; H04N 21/435; H04N 19/10; H04N 19/115; H04N 13/0048; H04N 19/172; H04N 19/44; H04N 19/597; H04N 13/0059; H04N 19/137; H04N 19/136; H04N 19/70; H04N 13/0007; H04N 13/0055; H04N 13/0242; H04N 19/105; G06F 9/5016; G06F 9/5027; G06F 3/033; G06F 3/1415; G06F 3/1454

See application file for complete search history.

(56) References Cited

U.S. PATENT DOCUMENTS

| | | | | |
|---|---|---|---|---|
| 7,697,039 | B2* | 4/2010 | Shiota | G06F 17/30247 348/231.2 |
| 7,706,036 | B2* | 4/2010 | Yoshida | H04N 1/6019 358/1.9 |
| 8,223,270 | B2 | 7/2012 | Hayashi et al. | |
| 9,110,521 | B2* | 8/2015 | Suzuki | G06F 3/0346 |
| 9,338,430 | B2* | 5/2016 | Hattori | H04N 13/0048 |
| 9,350,972 | B2* | 5/2016 | Hattori | H04N 13/0029 |
| 2002/0088007 | A1* | 7/2002 | Shimoji | H04H 20/93 725/135 |
| 2003/0025841 | A1 | 2/2003 | Sawyer | |
| 2005/0008260 | A1 | 1/2005 | Kondo et al. | |
| 2005/0174586 | A1* | 8/2005 | Yoshida | G06T 11/001 358/1.9 |
| 2006/0055825 | A1* | 3/2006 | Shiota | G06F 17/30247 348/563 |
| 2006/0093380 | A1* | 5/2006 | Sugiura | G03G 15/5087 399/8 |
| 2007/0031052 | A1* | 2/2007 | Turaga | H04N 19/105 382/240 |
| 2007/0070472 | A1* | 3/2007 | Kato | H04N 1/3875 358/537 |
| 2007/0110389 | A1 | 5/2007 | Hayashi et al. | |
| 2007/0248331 | A1 | 10/2007 | Hamada et al. | |
| 2009/0148070 | A1* | 6/2009 | Hwang | H04N 13/0048 382/305 |
| 2010/0253621 | A1* | 10/2010 | Suzuki | G06F 3/0346 345/157 |
| 2013/0141535 | A1* | 6/2013 | Hattori | H04N 13/0048 348/43 |
| 2014/0028797 | A1* | 1/2014 | Hattori | H04N 13/0029 348/43 |

FOREIGN PATENT DOCUMENTS

| | | |
|---|---|---|
| JP | 1996336134 A | 12/1996 |
| JP | 2000-040966 | 2/2000 |
| JP | 2000-040966 A | 2/2000 |
| JP | 3072306 | 7/2000 |
| JP | 2003-134411 | 5/2003 |
| JP | 2003-172959 | 6/2003 |
| JP | 2004-357062 A | 12/2004 |
| JP | 2007-096541 | 4/2007 |
| JP | 2007-135059 | 5/2007 |
| JP | 2007295142 A | 11/2007 |
| JP | 2008-312083 | 12/2008 |
| WO | 03103289 A1 | 12/2003 |

OTHER PUBLICATIONS

Luis Corte-Rea; et al: "A Very Low Bit Rate Video Coder Based on Vector Quantization", vol. 5, No. 2, Feb. 1, 1996.

International Search Report dated Nov. 5, 2013, which issued during prosecution of International Application No. PCT/JP2013/072267, which corresponds to the present application.

Zhu Li, et al. "A Color Vector Quantization Based on Video Coder" Proceedings of International Conference on Image Processing (ICIP 2002), 2002, vol. 3, pp. III-673-III-676.

European Communication dated Dec. 23, 2016 issued in corresponding European Application No. 13830282.3.

Decision of Rejection dated Jan. 26, 2017 issued in corresponding International Patent Application No. 2014-531647 (including full machine translation).

Notification of Reasons for Refusal dated Oct. 28, 2016, which issued during the prosecution of Japanese Patent Application No. 2014-531647.

First Office Action dated Mar. 29, 2017 during the prosecution of Chinese Patent Application No. 2013800412058 with English Translation.

Office Action issued during the prosecution of Taiwanese Patent Application No. 102130349 with English Translation.

Second Office Action dated Aug. 31, 2017 during the prosecution of Chinese Patent Application No. 2013800412058.

Summons to attend oral proceedings pursuant to Rule 115(1) EPC mailed on Oct. 10, 2017 during the prosecution of European Patent Application No. 13830282.3.

The Third Office Action dated Feb. 5, 2018 during the prosecution of Chinese Patent Application No. CN2013800412058 with English machine translation.

Notification of Reasons for Refusal dated Apr. 5, 2018 during the prosecution of Japanese Patent Application No. 2014-531647 with English machine translation.

Zhu Li and A.K. Katsaggelos, A color vector quantization based video coder, Proceedings of International Conference on Image Processing (ICIP 2002), IEEE, Year 2002, vol. 3, pp. III-673-III-676.

* cited by examiner

RECEIVING APPARATUS, TRANSMITTING APPARATUS, AND IMAGE TRANSMITTING METHOD

CROSS-REFERENCE TO RELATED APPLICATION

This is a U.S. national phase application under 35 U.S.C. § 371 of International Patent Application No. PCT/JP2013/072267, filed on Aug. 21, 2013, and claims benefit of priority to Japanese Patent Application No. JP 2012-184921, filed on Aug. 24, 2012. The International Application was published on Feb. 27, 2014, as International Publication No. WO 2014/030665 under PCT Article 21(2). The entire contents of these Applications are hereby incorporated herein by reference.

TECHNICAL FIELD

The present invention relates to a transmitting and receiving system and the like for transmitting and receiving images.

BACKGROUND

Conventionally, there is an image conversion device capable of compensating resolution, which can be applied to up-conversion that converts standard resolution television signals into high resolution television signals. See, for example, Japanese Patent Application Publication No. H5-167992 at, among others, page 1 and FIG. 1. This image conversion device is used in a television receiving apparatus.

Furthermore, there is a so-called up-conversion TV tuner. See, for example, Japanese Patent Application Publication No. 2003-134411 at, among others, page 1 and FIG. 1.

Also, there is an up-conversion image display device. See, for example, Japanese Patent Application Publication No. 2003-172959 at, among others, page 1 and FIG. 1.

Also, there is a transmitting and receiving system in which compression of moving images is performed on the transmission side and streaming reproduction is performed on the reception side. See, for example, Japanese Patent Application Publication No. 2007-135059 at, among others, page 1 and FIG. 1.

Moreover, various encoding methods for moving image compression have been proposed. See, for example, Japanese Patent Application Publication No. 2007-96541 at, among others, page 1 and FIG. 1. Known examples of the encoding methods include H.264.

However, conventional transmitting and receiving systems cannot output high quality images at a receiving apparatus while reducing the size of data that is to be transmitted.

That is to say, in the case of transmitting images using an encoding method such as H.264, for example, the size of data that is to be transmitted can be reduced, but, since high frequency components are removed, temporal and spatial image details are lost, and high quality images cannot be output at a receiving apparatus.

Furthermore, in the case of outputting high quality images at a receiving apparatus, the size of data that is to be transmitted becomes huge.

SUMMARY

A first aspect of the present invention is directed to a transmitting apparatus, in a transmitting and receiving system provided with the transmitting apparatus that transmits an image and a receiving apparatus, wherein the transmitting apparatus includes: an image accepting unit that accepts a first image; a transmission-side correspondence table storage unit in which a transmission-side correspondence table is stored, the transmission-side correspondence table having multiple pieces of transmission-side correspondence information for associating a first image block, which is a block forming the first image, with a second image block, which is a block corresponding to the first image block and forming a second image; a preprocessing unit that acquires one or at least two blocks from the first image accepted by the image accepting unit, acquires one or at least two second image blocks respectively corresponding to the one or at least two blocks from the transmission-side correspondence table storage unit, and constructs a second image from the one or at least two second image blocks; and a transmitting unit that transmits the second image; and the receiving apparatus includes: a receiving unit that receives the second image; a generating unit that generates a third image from the second image; and an output unit that outputs the third image.

With this configuration, it is possible to reduce the size of data that is to be transmitted, and to output high quality images at the receiving apparatus.

Furthermore, a second aspect of the present invention is directed to the transmitting apparatus according to the first aspect, wherein the transmitting apparatus further includes an encoding unit that encodes the second image, thereby acquiring an encoded image, the transmitting unit transmits the encoded image, the receiving unit receives the encoded image, the receiving apparatus further includes a decoding unit that decodes the encoded image received by the receiving unit, thereby acquiring the second image, and the generating unit generates a third image from the second image acquired by the decoding unit.

With this configuration, it is possible to reduce the size of data that is to be transmitted, and to output high quality images at the receiving apparatus.

Furthermore, a third aspect of the present invention is directed to the transmitting apparatus according to the first or the second aspect, wherein the generating unit includes: a reception-side correspondence table storage part in which a reception-side correspondence table is stored, the reception-side correspondence table having multiple pieces of reception-side correspondence information for associating the second image block, which is a block forming the second image, with a third image block, which is a block corresponding to the second image block and having a third resolution; a reception-side dividing part that acquires one or at least two blocks from the second image, thereby acquiring one or at least two second image blocks; a third image block acquiring part that acquires one or at least two third image blocks respectively corresponding to the one or at least two second image blocks acquired by the reception-side dividing part, from the reception-side correspondence table storage part; and a third image constructing part that constructs a third image from the one or at least two third image blocks acquired by the third image block acquiring part.

With this configuration, it is possible to reduce the size of data that is to be transmitted, and to output high quality images at the receiving apparatus.

Furthermore, a fourth aspect of the present invention is directed to the transmitting apparatus according to any one of the first to the third aspects, wherein the preprocessing unit includes a feature amount acquiring part that acquires one or at least two feature amounts from the first image accepted by the image accepting unit, the transmitting unit transmits the one or at least two feature amounts and either one of the second image and the encoded image, the receiving unit receives the one or at least two feature amounts and either one of the second image and the encoded image, and the generating unit generates a third image from either one of the second image received by the receiving unit and the second image acquired by the decoding unit, using the one or at least two feature amounts.

With this configuration, it is possible to reduce the size of data that is to be transmitted, and to output higher quality images at the receiving apparatus.

Furthermore, a fifth aspect of the present invention is directed to the transmitting apparatus according to the fourth aspect, wherein one of the one or at least two feature amounts is an encoding method identifier for identifying an encoding method, the reception-side correspondence table storage part has at least two reception-side correspondence tables for respective encoding method identifiers, the third image block acquiring part acquires one or at least two third image blocks respectively corresponding to the one or at least two second image blocks acquired by the reception-side dividing part, from a reception-side correspondence table corresponding to the encoding method identifier.

With this configuration, it is possible to reduce the size of data that is to be transmitted, and to output high quality images at the receiving apparatus.

Furthermore, a sixth aspect of the present invention is directed to the transmitting apparatus according to the fourth aspect, wherein the feature amount acquiring part acquires one or at least two prediction coefficients, each of which is a spatiotemporal parameter, from an image forming one or at least two previous fields and a current image.

With this configuration, it is possible to reduce the size of data that is to be transmitted, and to output high quality images at the receiving apparatus.

The transmitting and receiving system according to the present invention can reduce the size of data that is to be transmitted and can output high quality images at a receiving apparatus.

DETAILED DESCRIPTION

Figure 1:
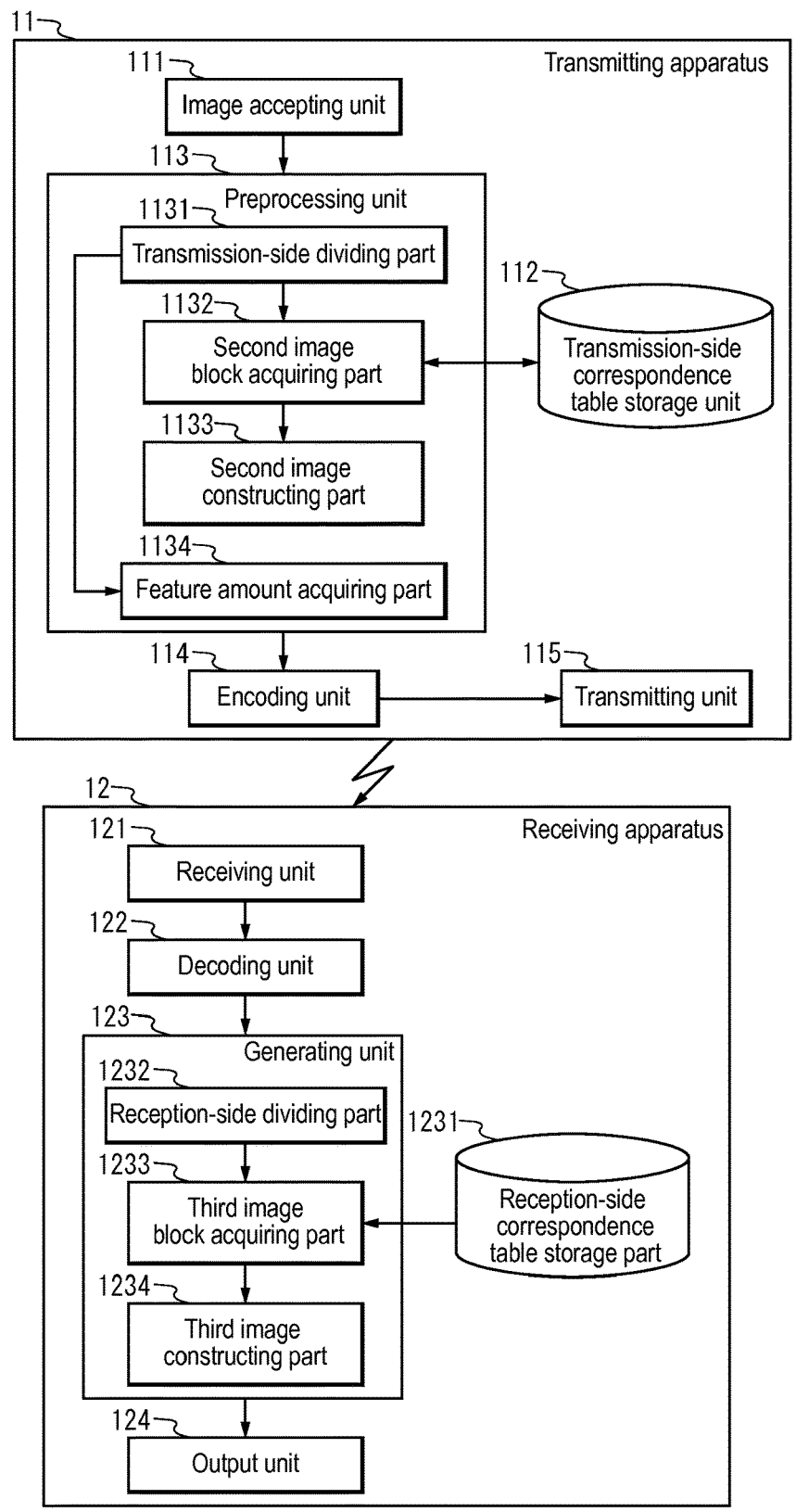
FIG. 1 is a block diagram of a transmitting and receiving system in Example.

Hereinafter, examples of a transmitting and receiving system and the like will be described with reference to the drawings. Note that constituent elements denoted by the same reference numerals perform the same operations in the examples, and, thus, a description thereof may not be repeated.

EXAMPLE

In this example, a transmitting and receiving system 1 that can reduce the size of data that is to be transmitted and can output high quality images will be described. The transmitting and receiving system 1 includes a transmitting apparatus 11 that transmits an image and a receiving apparatus 12.

The transmitting apparatus 11 performs preprocessing that allows the receiving apparatus 12 to make up for image information that will be lost by encoding, and, then, encodes an image and transmits the encoded image. Furthermore, the receiving apparatus 12 receives and decodes the encoded image. The receiving apparatus 12 performs processing that makes up for the preprocessing performed by the transmitting apparatus 11, on the decoded image, and outputs the image.

Furthermore, in this example, the transmitting apparatus 11 acquires and transmits one or more feature amounts of the image. The receiving apparatus 12 receives the one or more feature amounts, and uses the feature amounts for generating a high resolution image.

In this example, it will be appreciated that the transmitting apparatus 11 may transmit an image and audio data. Moreover, it will be appreciated that the receiving apparatus 12 may receive an image and audio data. In this specification, an image is typically a moving image, but may be a still image.

Furthermore, in this example, an image that is obtained merely by performing preprocessing without performing encoding may be transmitted. In this case, the receiving apparatus 12 does not perform decoding, and generates an output image from the received image. Furthermore, in this example, it is possible to output an image stored in a storage medium such as a hard disk, or an image accumulated by the receiving apparatus 12 in a storage medium, instead of transmitting an image encoded by the transmitting apparatus 11.

FIG. 1 is a block diagram of the transmitting and receiving system 1 in this example. The transmitting apparatus 11 includes an image accepting unit 111, a transmission-side correspondence table storage unit 112, a preprocessing unit 113, an encoding unit 114, and a transmitting unit 115.

The preprocessing unit 113 includes a transmission-side dividing part 1131, a second image block acquiring part 1132, a second image constructing part 1133, and a feature amount acquiring part 1134.

The receiving apparatus 12 includes a receiving unit 121, a decoding unit 122, a generating unit 123, and an output unit 124.

The generating unit 123 includes a reception-side correspondence table storage part 1231, a reception-side dividing part 1232, a third image block acquiring part 1233, and a third image constructing part 1234.

The image accepting unit 111 forming the transmitting apparatus 11 accepts a first image. The first image may contain noise. Furthermore, the first image is an image having a first resolution. The accepting may be receiving from a camera, or may be reading from a storage medium such as an optical disk, a magnetic disk, or a semiconductor memory. There is no limitation on the method for accepting the first image.

In the transmission-side correspondence table storage unit 112, a transmission-side correspondence table having multiple pieces of transmission-side correspondence information is stored. The transmission-side correspondence information is information for associating a first image block, which is a block forming the first image, with a second image block, which is a block forming a second image. Furthermore, the transmission-side correspondence information is information for converting the first image into a second image, which is more suitable for transmission. The second image is, for example, an image obtained by removing noise from the first image. Furthermore, the second image is, for example, an image obtained by subsampling the first image, thereby reducing the resolution.

Furthermore, preferably, the first image block is not image data itself forming the first image, but is one or more parameters indicating features of image data forming the first image. The parameters are, for example, a maximum value (MAX) of pixel data of the first image block, a minimum value (MIN) thereof, a dynamic range (DR) represented by "MAX−MIN", information obtained by dividing the dynamic range into two equal portions, performing quantization, and subtracting the minimum value (MIN), thereby normalizing the pixel data, and quantizing (re-quantizing) the normalized data, or the like. The transmission-side correspondence information may have the first image block (it may be one or more parameters) and the second image block, or may have identifying information of the first image block and identifying information of the second image block. In this case, the first image block and the second image block may be present in the transmitting apparatus 11, or may be present outside the transmitting apparatus 11. The second image is an image having a second resolution, for example, obtained removing noise from the first image. Furthermore, the second image may be an image totally different from the output of the first image when the second image is output. That is to say, the first image is, for example, an image obtained by capturing images of one or more objects with a camera. The second image is, for example, an image in which the viewer cannot recognize the one or more objects. That is to say, for example, the second image may be an image that cannot be viewed (that does not have enough quality for viewing), contrary to the first image. The second image may be any image from which a third image (described later) can be generated by the receiving apparatus 12. The second resolution, which is a resolution of the second image, is preferably higher than the first resolution, which is a resolution of the first image, but may be the same as the first resolution. Furthermore, the second resolution may be lower than the first resolution. Furthermore, it will be appreciated that the removing noise may be removing part of the noise. Furthermore, the second image is, for example, an image obtained by adjusting the information amount of the first image. The adjusting the information amount is, for example, subsampling, quantizing, or the like.

The transmission-side correspondence table storage unit 112 is preferably a non-volatile storage medium, but may be realized also by a volatile storage medium. There is no limitation the procedure in which the transmission-side correspondence table is stored in the transmission-side correspondence table storage unit 112. For example, the transmission-side correspondence table may be stored in the transmission-side correspondence table storage unit via a storage medium, the transmission-side correspondence table transmitted via a communication line or the like may be stored in the transmission-side correspondence table storage unit 112, or the transmission-side correspondence table input via an input device may be stored in the transmission-side correspondence table storage unit 112.

The preprocessing unit 113 divides the first image accepted by the image accepting unit 111 into two or more blocks, acquires two or more second image blocks respectively corresponding to the two or more blocks, and constructs a second image from the two or more second image blocks.

The preprocessing unit 113 may acquire a second image block (this block is the second image itself) corresponding to the first image accepted by the image accepting unit 111, without dividing the first image. That is to say, the preprocessing unit 113 acquires one or more blocks from the first image accepted by the image accepting unit 111, acquires one or more second image blocks respectively corresponding to the one or more blocks from the transmission-side correspondence table storage unit 112, and constructs a second image from the one or more second image blocks.

The preprocessing unit 113 may be realized typically by an MPU, a memory, or the like. Typically, the processing procedure of the preprocessing unit 113 is realized by software, and the software is stored in a storage medium such as a ROM. Note that it may be realized also by hardware (a dedicated circuit).

Figure 2:
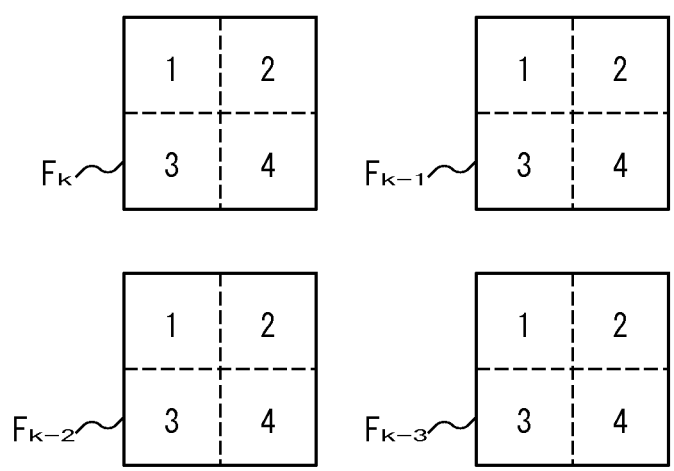
FIG. 2 is a diagram illustrating block acquisition in the example.

The transmission-side dividing part 1131 acquires one or more first image blocks from the first image accepted by the image accepting unit 111. For example, the transmission-side dividing part 1131 preferably divides the first image accepted by the image accepting unit 111 into two or more blocks, thereby acquiring two or more first image blocks. The transmission-side dividing part 1131 accepts a first image (e.g., television signals, in this case) digitalized at a predetermined sampling frequency, and converts the order of television signals into the order of blocks. The transmission-side dividing part 1131 is realized, for example, by two or more (e.g., "4" in this example) scanning line conversion circuits. An image of a current field, an image of a field one field before, an image of a field two fields before, and an image of a field three fields before are respectively supplied to the four scanning line conversion circuits. Data of each field is generated in the order of the blocks at the output terminals of the four scanning line conversion circuits. Regarding an image $F_k$ of the current field, an image in one block each is output to the output terminal of the scanning line conversion circuit, in the order of the numbers assigned in FIG. 2. Also regarding an image $F_{k-1}$ of a field one field before, an image $F_{k-2}$ of a field two fields before, and an image $F_{k-3}$ of a field three fields before, an image in one block each is output to the output terminals of the respective scanning line conversion circuits, in the order of the numbers assigned in FIG. 2, as in the case of the image $F_k$. The order of data output within one block is similar to that of television scanning Each scanning line conversion circuit has a memory for block acquisition. If one field has (210 lines×684) pixels, the total number of pixels is 143640. If one field is divided into four equal portions as shown in FIG. 2, the number of pixels contained in one block is (105×342=35910).

The second image block acquiring part 1132 acquires one or more second image blocks respectively corresponding to the one or more first image blocks acquired by the transmission-side dividing part 1131, from the transmission-side correspondence table storage unit 112. For example, the second image block acquiring part 1132 acquires one or more parameters of each of the one or more first image blocks, and acquires a second image block corresponding to the one or more parameters, from the transmission-side correspondence table storage unit 112.

The second image constructing part 1133 constructs a second image from the one or more second image blocks acquired by the second image block acquiring part 1132. If the number of second image blocks acquired by the second image block acquiring part 1132 is one, the second image constructing part 1133 performs processing that merely acquires that second image block (second image).

The feature amount acquiring part 1134 acquires one or more feature amounts from the first image accepted by the image accepting unit 111. The feature amounts are, for example, an encoding method identifier (it may be referred to as a format identifier), sampling pattern information indicating a sampling pattern, a prediction coefficient, or the like. The encoding method identifier is, for example, "H.264", "MPEG-4 AVC", "MPEG-2", or the like indicating the encoding method. The sampling pattern information is information (e.g., "1", "2", etc.) for identifying a sampling pattern known in advance by the transmitting apparatus 11 and the receiving apparatus 12. With the sampling pattern information, a spatial sampling method or a temporal sampling method is determined.

The prediction coefficient is a parameter for defining a spatiotemporal relational expression as defined in linear combination for acquiring pixel data of a current field from pixel data of several previous fields (a predetermined number of fields, for example, three fields). An example of the method for acquiring a prediction coefficient is described in "JP S62-102685A". In this case, the feature amount acquiring part 1134 acquires one or more prediction coefficients, which are spatiotemporal parameters, from images forming one or more previous fields and a current image.

Specifically, as described in "JP 562-102685A" and "Japanese Patent No. 3072306", for example, the feature amount acquiring part 1134 identifies a parameter for defining a spatiotemporal relational expression as defined in linear combination, from pixel data in a block obtained by dividing a current field, and pixel data, which is pixel data of several previous fields, in the corresponding block. In this case, the feature amount acquiring part 1134 uses, for example, the least squares method. For example, the feature amount acquiring part 1134 acquires 35 parameters for each block. First, the feature amount acquiring part 1134 calculates prediction data using a linear combination equation. The linear combination equation is Equation 1 below.

$$\begin{bmatrix} I_k(x_1, y_1) \\ I_k(x_2, y_1) \\ \vdots \\ I_k(x_1, y_2) \\ I_k(x_2, y_2) \\ \vdots \\ I_k(x_m, y_n) \end{bmatrix} = \quad \text{Equation 1}$$

$$\begin{bmatrix} I_{k-1}(x_1-2, y_1+1) & \cdots & I_{k-3}(x_1+2, y_1-1) \\ I_{k-1}(x_2-2, y_1+1) & \cdots & I_{k-3}(x_2+2, y_1-1) \\ \vdots & \vdots & \vdots \\ I_{k-1}(x_1-2, y_2+1) & \cdots & I_{k-3}(x_1-2, y_2+1) \\ \vdots & \vdots & \vdots \\ I_{k-1}(x_2-2, y_2+1) & \cdots & I_{k-3}(x_2-2, y_2+1) \\ \vdots & \vdots & \vdots \\ I_{k-1}(x_m-2, y_n+1) & \cdots & I_{k-3}(x_m-2, y_n+1) \end{bmatrix} \times \begin{bmatrix} w1 \\ w2 \\ \vdots \\ w35 \end{bmatrix}$$

Equation 1 can be represented in summary by "i=I·w" using a matrix and vectors. In the equation, i is an (m×n)-dimensional vector, I is an (m×n, 35) matrix, and w is a 35-dimensional vector. Note that (m×n) represents all pixels or representative points in one block.

On the other hand, a vector j in which data sets (true values) of pixels or representative points of the current field are arranged is an (m×n)-dimensional vector, and, if e is an (m×n)-dimensional prediction error vector, "j=i+e=I·w+e" is obtained. This equation can be represented by "e=j−I·w".

A parameter w that minimizes the squared-sum of the prediction error vector e is obtained. The above-mentioned equation can be modified as below. Note that T represents a transposed matrix.

$$e^T e = (j-I \cdot W)^T(j-I \cdot w) = j^T j - j^T Iw - w^T I^T j - w^T I^T Iw$$

In this equation, the parameter w that minimizes $e^T e$ satisfies Equation 2 below.

$$\frac{\partial (e^T e)}{\partial w} = -I^T j + I^T Iw = 0 \quad \text{Equation 2}$$

$$\therefore w = (I^T I)^{-1} I^T j$$

Equation 2 is obtained, for example, as described in Chapter 4, Section 4, Subsection 2 of the document "System Identification" (published by the Society of Instrument and Control Engineers, Feb. 10, 1981 (first edition)).

In this case, if one block has (m×n) pixels, a matrix that is as large as (m×n, 35) has to be processed, which is not appropriate. Accordingly, the above-mentioned equation is modified such that the matrix and the vector have a smaller number of dimensions. That is to say, a (35, 35) matrix of ($P=I^T \cdot I$) and a 35-dimensional vector of ($Q=I^T \cdot J$) are used. Equation 3 shows P and Q.

$$P = \sum_{i=1 \sim m} \sum_{j=1 \sim n} \begin{bmatrix} I_{k-1}(x_i-2, y_j+1) \\ I_{k-1}(x_i-1, y_j+1) \\ \vdots \\ I_{k-3}(x_i+2, y_j-1) \end{bmatrix} \times [I_{k\,1}(x_i-2, y_j+1)$$

$$I_{k\,1}(x_i-1, y_j+1) \ldots I_{k\,3}(x_i+2, y_j-1)]$$

$$\text{Equation 3}$$

$$Q = \sum_{i=1 \sim m} \sum_{j=1 \sim n} \begin{bmatrix} I_{k-1}(x_i-2, y_j+1) \\ I_{k-1}(x_i-1, y_j+1) \\ \vdots \\ I_{k-3}(x_i+2, y_j-1) \end{bmatrix} \times I_k(x_i, y_j)$$

The feature amount acquiring part 1134 calculates P and Q from prediction data of three previous fields. The parameters are calculated from ($P^{-1}Q$).

The transmission-side dividing part 1131, the second image block acquiring part 1132, the second image constructing part 1133, and the feature amount acquiring part 1134 may be realized typically by an MPU, a memory, or the like. Typically, the processing procedure of the second image block acquiring part 1132 is realized by software, and the software is stored in a storage medium such as a ROM. Note that it may be realized also by hardware (a dedicated circuit).

The encoding unit 114 encodes the second image, thereby acquiring an encoded image. There is no limitation on the encoding method by the encoding unit 114. The encoding method is preferably a method that can efficiently perform compression of moving images. Examples of the encoding method include H.264 (it may be referred to as MPEG-4 AVC) and the like. The encoding method may be MPEG-2. Note that, as described above, there may be no encoding unit 114.

The encoding unit 114 may be realized typically by an MPU, a memory, or the like. Typically, the processing procedure of the encoding unit 114 is realized by software, and the software is stored in a storage medium such as a ROM. Note that it may be realized also by hardware (a dedicated circuit).

The transmitting unit 115 transmits the one or more feature amounts and the encoded image. Furthermore, if there is no encoding unit 114, the transmitting unit 115 transmits the one or more feature amounts and the second image. Furthermore, the transmitting unit 115 may transmit only the encoded image or only the second image. In this case, the feature amount acquiring part 1134 is not necessary. Furthermore, the transmitting unit 115 may accumulate the information in an unshown storage medium instead of transmitting it. That is to say, the transmitting is a concept that encompasses accumulating (writing to a storage medium).

The transmitting unit 115 is realized typically by a wireless or wired communication part. Note that the transmitting unit 115 may be realized also by a broadcasting part.

The receiving unit 121 forming the receiving apparatus 12 receives the encoded image or the second image. The receiving unit 121 may receive the one or more feature amounts and the encoded image, or the one or more feature amounts and the second image. The receiving unit 121 is realized typically by a wireless or wired communication part, but may be realized also by a broadcast receiving part. The receiving unit 121 may acquire an image stored in a storage medium.

The decoding unit 122 decodes the encoded image received by the receiving unit 121, thereby acquiring the second image. The decoding unit 122 may be realized by a known art (e.g., H.264 decoder). The decoding unit 122 may be realized typically by an MPU, a memory, or the like. Typically, the processing procedure of the decoding unit 122 is realized by software, and the software is stored in a storage medium such as a ROM. Note that it may be realized also by hardware (a dedicated circuit). Note that, as described above, there may be no decoding unit 122.

The generating unit 123 generates a third image from the second image received by the receiving unit 121 or the second image acquired by the decoding unit 122. The generating unit 123 preferably generates a third image having a resolution higher than the resolution of the second image, from the second image acquired by the decoding unit 122, using the one or more feature amounts.

It is sufficient that the generating unit 123 generates a third image having a high quality, from the second image. The high quality image may be an image having a high resolution (spatial resolution) as described above, may be an image having a high temporal resolution (high frame rate), or may be a fine gradation image (high gradation image). Furthermore, the high quality image may be, for example, an image having a high SNR (whose difference from the first image is small), an image whose degree in image degradation or destruction caused by encoding is small, a high definition image, a smooth image, a natural image that hardly gives a sense of unnaturalness, or the like.

The generating unit 123 may be realized typically by an MPU, a memory, or the like. Typically, the processing procedure of the generating unit 123 is realized by software, and the software is stored in a storage medium such as a ROM. Note that it may be realized also by hardware (a dedicated circuit).

In the reception-side correspondence table storage part 1231, a reception-side correspondence table having multiple pieces of reception-side correspondence information is stored. The reception-side correspondence information is information for associating the second image block with the third image block. The second image block does not have to be the second image block itself, and may be one or more parameters indicating features of the second image block. The reception-side correspondence information may be information having the second image block and the third image block, or may be information having identifying information of the second image block and identifying information of the third image block. In this case, the second image block and the third image block may be held by the receiving apparatus 12, or by an apparatus outside the receiving apparatus 12. The third image block is a block forming the third image. The resolution of the third image may be higher than the first resolution.

In the reception-side correspondence table storage part 1231, two or more reception-side correspondence tables are preferably held for respective encoding method identifiers.

The reception-side correspondence table storage part 1231 is preferably a non-volatile storage medium, but may be realized also by a volatile storage medium. There is no limitation on the procedure in which the reception-side correspondence table is stored in the reception-side correspondence table storage part 1231. For example, the reception-side correspondence table may be stored in the reception-side correspondence table storage part 1231 via a storage medium, the reception-side correspondence table transmitted via a communication line or the like may be stored in the reception-side correspondence table storage part 1231, or the reception-side correspondence table input via an input device may be stored in the reception-side correspondence table storage part 1231.

The reception-side dividing part 1232 acquires one or more second image blocks from the second image. The processing by the reception-side dividing part 1232 and the processing by the transmission-side dividing part 1131 are performed on different images, but may be the same processing.

The reception-side dividing part 1232 may be realized typically by an MPU, a memory, or the like. Typically, the processing procedure of the reception-side dividing part 1232 is realized by software, and the software is stored in a storage medium such as a ROM. Note that it may be realized also by hardware (a dedicated circuit).

The third image block acquiring part 1233 acquires one or more third image blocks respectively corresponding to the one or more second image blocks acquired by the reception-side dividing part 1232, from the reception-side correspondence table storage part 1231. Furthermore, the third image block acquiring part 1233 preferably acquires one or more third image blocks respectively corresponding to the one or more second image blocks acquired by the reception-side dividing part 1232, from a reception-side correspondence table corresponding to the encoding method identifier. The processing by the third image block acquiring part 1233 and the processing by the second image block acquiring part 1132 use different correspondence tables, but may be the same processing.

The third image block acquiring part 1233 may be realized typically by an MPU, a memory, or the like. Typically, the processing procedure of the third image block acquiring part 1233 is realized by software, and the software is stored in a storage medium such as a ROM. Note that it may be realized also by hardware (a dedicated circuit).

The third image constructing part 1234 constructs a third image from the one or more third image blocks acquired by the third image block acquiring part 1233. If the number of third image blocks acquired by the third image block acquiring part 1233 is one, the third image constructing part 1234 performs processing that merely acquires that third image block.

The third image constructing part 1234 may be realized typically by an MPU, a memory, or the like. Typically, the processing procedure of the third image constructing part 1234 is realized by software, and the software is stored in a storage medium such as a ROM. Note that it may be realized also by hardware (a dedicated circuit).

The output unit 124 outputs the third image acquired by the generating unit 123. The output in this example is a concept that encompasses displaying on a display screen, projection using a projector, transmission to an external apparatus (display apparatus), accumulation in a storage medium, delivery of a processing result to another processing apparatus or another program, and the like.

The output unit 124 may be considered to include or not to include an output device such as a display screen or the like. The output unit 124 may be realized, for example, by driver software for an output device, a combination of driver software for an output device and the output device, or the like.

Next, an operation of the transmitting apparatus 11 forming the transmitting and receiving system 1 will be described with reference to the flowchart in FIG. 3.

(Step S301) It is judged whether or not the image accepting unit 111 has accepted an image. The image that is to be accepted is a 1-field image forming the first image. If the first image is a moving image, 1-field images are successively accepted.

(Step S302) The preprocessing unit 113 performs preprocessing on the image accepted in step S301. Later, an example of the preprocessing will be described in detail with reference to the flowchart in FIG. 4.

(Step S303) The encoding unit 114 encodes a second image, which is an image obtained as a result of the preprocessing performed in step S302, thereby acquiring an encoded image. The encoding process is, for example, encoding as defined in H.264. Note that this process does not include a process that extracts one or more feature amounts. The process that extracts feature amounts is performed in step S304, which will be described later.

(Step S304) The preprocessing unit 113 acquires one or more feature amounts of the first image. The feature amounts of the first image may be feature amounts of a second image generated from the first image, or may be feature amounts of an encoded image generated from the first image.

(Step S305) The transmitting unit 115 transmits the one or more feature amounts acquired in step S304 and the encoded image acquired in step S303. The transmitting unit 115 may transmit only the encoded image. In this case, step S304 is not necessary.

Figure 3:
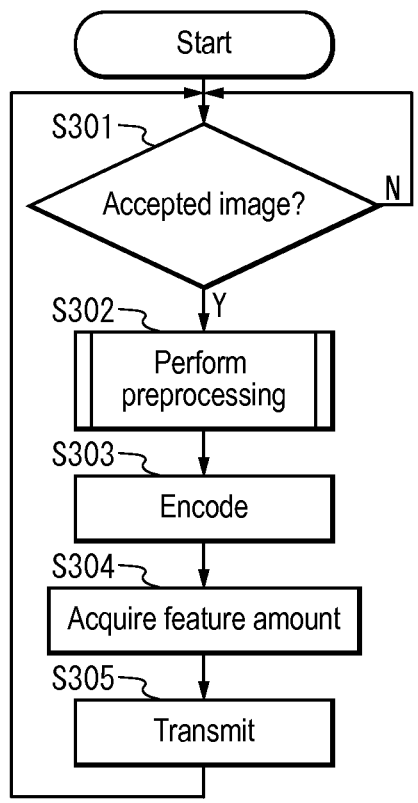
FIG. 3 is a flowchart illustrating an operation of a transmitting apparatus in the example.

In the flowchart in FIG. 3, the process that acquires the feature amounts in step S304 may be performed before the encoding process in step S303.

Furthermore, in the flowchart in FIG. 3, the feature amounts may not be acquired and transmitted. In this case, the processing in step S304 is not necessary.

Furthermore, in the flowchart in FIG. 3, the encoding process may not be performed. In this case, the processing in step S303 is not necessary. Furthermore, in this case, the transmitting unit 115 transmits the one or more feature amounts acquired in step S304 and the second image.

Note that the procedure is terminated by powering off or an interruption at completion of the process in the flowchart in FIG. 3.

Next, an example of the preprocessing in step S302 will be described in detail with reference to the flowchart in FIG. 4.

(Step S401) The transmission-side dividing part 1131 divides the image accepted by the image accepting unit 111 into two or more blocks, thereby acquiring two or more image blocks. Note that the transmission-side dividing part 1131 may merely acquire the image accepted by the image accepting unit 111, as one image block.

(Step S402) The second image block acquiring part 1132 substitutes 1 for a counter i.

(Step S403) The second image block acquiring part 1132 judges whether or not there is an i-th image block. If there is the i-th image block, the procedure advances to step S404, and, if not, the procedure returns to the upper-level processing.

(Step S404) The second image block acquiring part 1132 acquires one or more parameters of the i-th image block. The parameters are information indicating features of the i-th image block, and examples thereof include a maximum value (MAX) of pixel data of the image block, a minimum value (MIN) thereof, a dynamic range (DR) represented by "MAX−MIN", and the like.

(Step S405) The second image block acquiring part 1132 acquires a second image block corresponding to the one or more parameters acquired in step S404, from the transmission-side correspondence table storage unit 112.

(Step S406) The second image block acquiring part 1132 increments the counter i by 1. The procedure returns to step S403.

Figure 4:
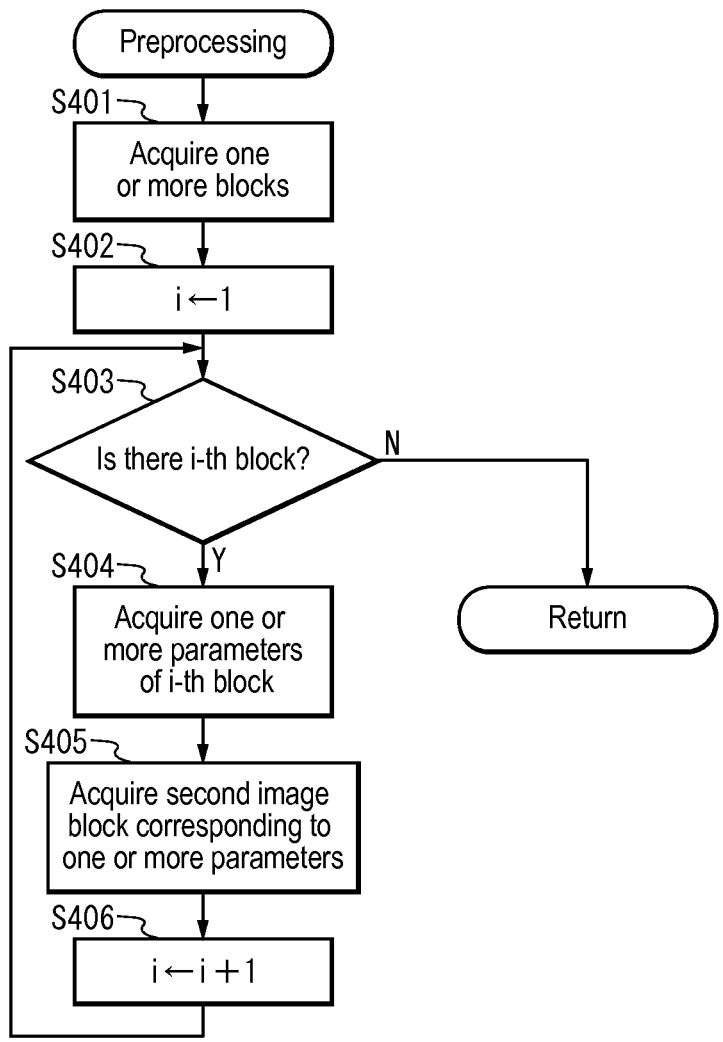
FIG. 4 is a flowchart illustrating in detail an example of preprocessing in the example.

In the flowchart in FIG. 4, the preprocessing may be noise removal, down-conversion, or the like.

Furthermore, in the flowchart in FIG. 4, the preprocessing may be adjustment of information, such as subsampling.

Next, an operation of the receiving apparatus 12 forming the transmitting and receiving system 1 will be described with reference to the flowchart in FIG. 5.

(Step S501) It is judged whether or not the receiving unit 121 has received the encoded image. If the encoded image has been received, the procedure advances to step S502, and, if not, the procedure returns to step S501.

(Step S502) The decoding unit 122 decodes the encoded image received in step S501, thereby acquiring the second image.

(Step S503) The generating unit 123 generates a third image having a resolution higher than the resolution of the second image, from the second image acquired in step S502. Later, the generating process will be described in detail with reference to the flowchart in FIG. 6.

(Step S504) The output unit 124 outputs the third image generated in step S503. The procedure returns to step S501.

Figure 5:
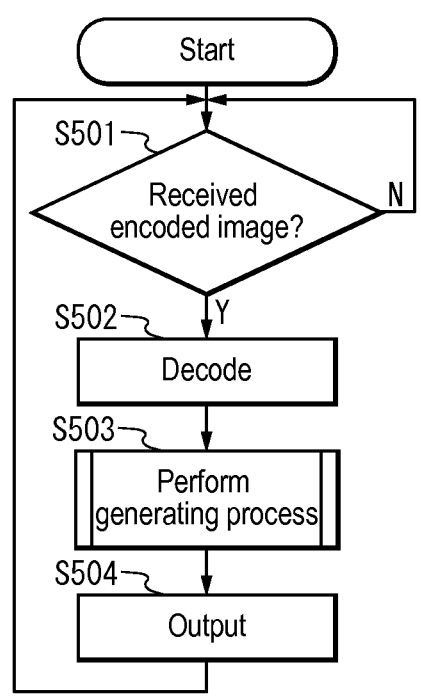
FIG. 5 is a flowchart illustrating an operation of a receiving apparatus in the example.

Note that the procedure is terminated by powering off or an interruption at completion of the process in the flowchart in FIG. 5.

Furthermore, in the flowchart in FIG. 5, the receiving unit 121 may receive the second image. In this case, the processing in step S502 is not necessary.

In step S503 of the flowchart in FIG. 5, the generating unit 123 generates a third image having a resolution higher than the resolution of the second image, from the second image. However, the generating unit 123 may generate a third image, which is an image having a higher quality than the second image, in terms of an aspect other than the resolution. The aspect other than the resolution is, for example, luminance or the like.

Next, the generating process in step S503 will be described in detail with reference to the flowchart in FIG. 6.

(Step S601) The reception-side dividing part 1232 divides the second image into two or more blocks, thereby acquiring two or more second image blocks. The reception-side dividing part 1232 may merely acquire the second image, without dividing the second image.

(Step S602) The third image block acquiring part 1233 substitutes 1 for a counter i.

(Step S603) The third image block acquiring part 1233 judges whether or not there is an i-th second image block. If there is the i-th second image block, the procedure advances to step S604, and, if not, the procedure advances to step S607.

(Step S604) The third image block acquiring part 1233 acquires one or more parameters of the i-th second image block. The parameters are information indicating features of the i-th second image block, and examples thereof include a maximum value (MAX) of pixel data of the image block, a minimum value (MIN) thereof, a dynamic range (DR) represented by "MAX−MIN", and the like.

(Step S605) The third image block acquiring part 1233 selects one reception-side correspondence table corresponding to one or more feature amounts (e.g., encoding method identifier, sampling pattern information, etc.) from among the one or more feature amounts received by the receiving unit 121, and acquires a third image block corresponding to the one or more parameters (second image block) acquired in step S604, from the reception-side correspondence table storage part 1231, with reference to the selected one reception-side correspondence table.

(Step S606) The third image block acquiring part 1233 increments the counter i by 1. The procedure returns to step S603.

(Step S607) The third image constructing part 1234 constructs a third image from the one or more third image blocks acquired by the third image block acquiring part 1233. The procedure returns to the upper-level processing.

Figure 6:
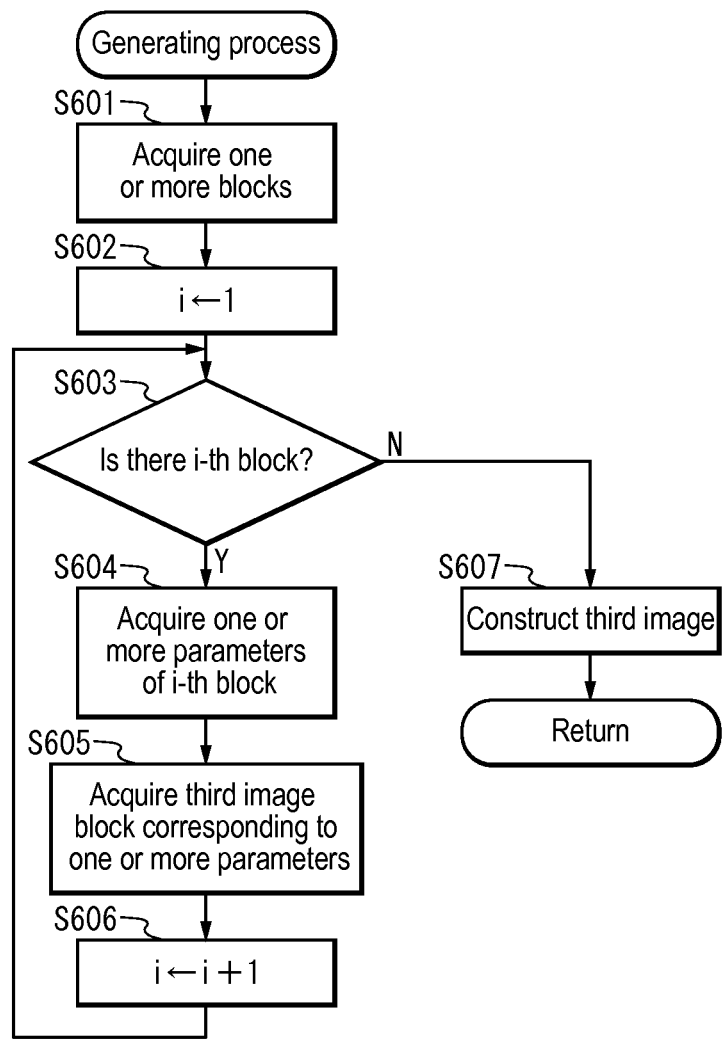
FIG. 6 is a flowchart illustrating an operation of a generating process in the example.

Note that the process that generates the third image in the flowchart in FIG. 6 is merely an example, and other methods also may be employed. Examples of the other methods include an image up-conversion method as described in Patent Document 3, for example.

Hereinafter, a specific operation of the process in which the second image constructing part 1133 of the transmitting apparatus 11 generates the second image in this example will be described. It is assumed that the image accepting unit 111 accepts a video signal, which is an image having the first resolution.

Figure 7:
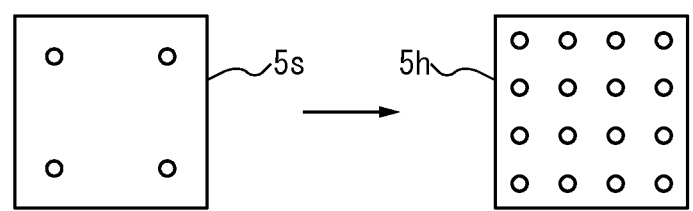
FIG. 7 is a diagram illustrating conversion of a video signal in the example.

First, the transmission-side dividing part 1131 converts the ordinary order of raster scanning of the video signal into the order of blocks. Then, as shown in FIG. 7, the transmission-side dividing part 1131 generates a video signal converted into a block $5s$ (2×2×8 bits=32 bits).

Figure 8:
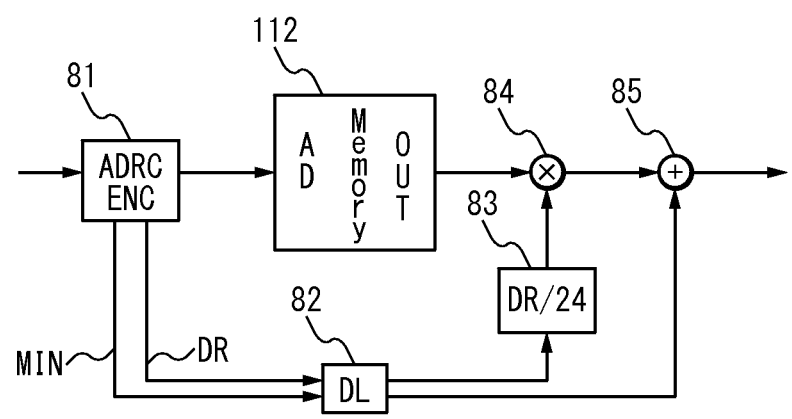
FIG. 8 is a diagram showing the structure of a second image block acquiring part in the example.

It is assumed that the second image block acquiring part 1132 has a structure, for example, as shown in FIG. 8.

The output signal (the block $5s$) of the transmission-side dividing part 1131 is supplied to an ADRC encoder 81. The ADRC (adaptive dynamic range coding) is compressing the number of bits in each pixel, for example, from 8 bits to 4 bits, using the fact that multiple pixels in a block have a spatial correlation.

The ADRC encoder 81 includes a circuit that detects a maximum value MAX of pixel data of the block, a minimum value MIN thereof, and a dynamic range DR represented by (MAX−MIN=DR), a circuit that divides the dynamic range DR into $2^4$ equal portions, thereby generating a quantization step, a subtracting circuit that performs subtraction of the minimum value MIN, thereby normalizing the pixel data of the block, and a quantization circuit that divides the output from the subtracting circuit by the quantization step, i.e., performs re-quantization. The ADRC encoder 81 outputs, for each block, the dynamic range DR, the minimum value MIN, and a 4-bit code signal DT corresponding to each pixel.

The code signal DT (16 bits in one block) in the output signal of the ADRC encoder 81 is supplied as an address to a memory 112 (the transmission-side correspondence table storage unit 112). In the memory 112, a mapping table based on a correlation between the encoded outputs of the first image and the second image is stored. The memory 112 is configured, for example, by a non-volatile RAM.

As shown in FIG. 7, an encoded video signal in a block $5h$ (4×4×4 bits) is read from the memory 112. The portion in which the block $5h$ occupies in one screen (one field or one frame) is the same as that of the block $5s$ of the input image. For example, if the first image has an aspect ratio of (4:3) and the second image has an aspect ratio of (16:9), for example, the output block $5h$ corresponding to the block $5s$ at the upper left corner of the input image is used as an image block on the upper side on the inner side of the upper left corner.

The dynamic range DR and the minimum value MIN in the encoded output of the ADRC encoder 81 are supplied to a delay circuit 82. The dynamic range DR that appears in the output of the delay circuit 82 is supplied to a dividing circuit 83, and is divided by $2^4=16$. Accordingly, a quantization step of the block is obtained from the dividing circuit 83.

The code signal of the block of the output image signal read from the memory 112 is supplied to a multiplier 84. The quantization step is supplied to the multiplier 84, and, thus, data after removing the minimum value can be restored from the multiplier 84. The output signal of the multiplier 84 is supplied to an adder 85, and the minimum value MIN from the delay circuit 82 is added thereto. Accordingly, restored data (4×4×8 bits) of video signal of the second image is obtained from the adder 85. This restored data is output to the second image constructing part 1133.

Next, the second image constructing part 1133 converts the order of data of the restored data (second image block) for each block into the order of raster scanning Thus, the second image constructing part 1133 obtains the second image.

The process in which the transmitting apparatus 11 generates the second image from the first image and the process in which the receiving apparatus 12 generates the third image from the second image may be similar processing.

As described above, this example can reduce the size of data that is to be transmitted and can output high resolution images at the receiving apparatus 12.

The processing by the transmitting apparatus 11 and the receiving apparatus 12 in this example may be realized using software. The software may be distributed by software download or the like. Furthermore, the software may be distributed in a form where the software is stored in a storage medium such as a CD-ROM. Note that the same is applied to other examples described in this specification. The software that realizes the transmitting apparatus 11 in this example may be the following sort of program. Specifically, this program is a program using a storage medium in which a transmission-side correspondence table is stored, the transmission-side correspondence table having multiple pieces of transmission-side correspondence information for associating a first image block, which is a block forming a first image, with a second image block, which is a block corresponding to the first image block and forming a second image, the program causing a computer to function as: an image accepting unit that accepts the first image; a preprocessing unit that acquires one or at least two blocks from the first image accepted by the image accepting unit, acquires one or at least two second image blocks respectively corresponding to the one or at least two blocks, and constructs a second image from the one or at least two second image blocks; and a transmitting unit that transmits the second image.

The software that realizes the receiving apparatus 12 in this example may be the following sort of program. Specifically, this program is a program for causing the computer to function as: a receiving unit that receives the second image; a generating unit that generates a third image from the second image; and an output unit that outputs the third image.

Figure 9:
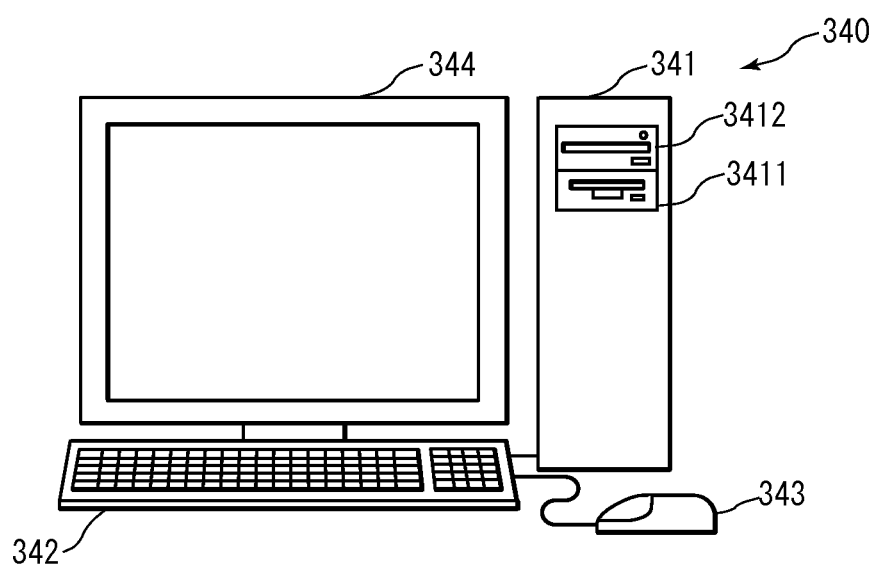
FIG. 9 is a schematic view showing a computer system in the example.
Figure 10:
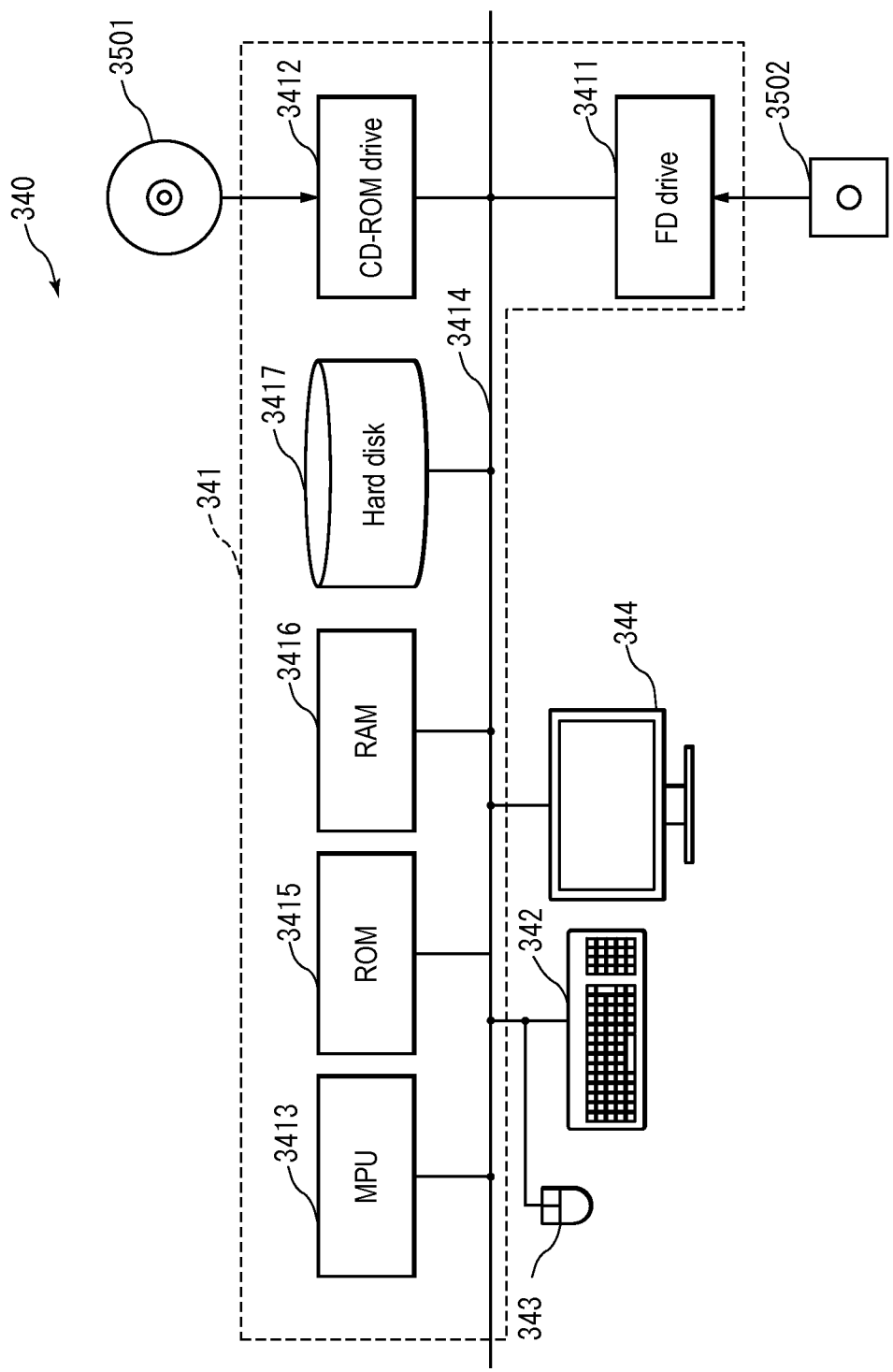
FIG. 10 is a block diagram of the computer system in the example.

FIG. 9 shows the external appearance of a computer that executes the program described in this specification to realize the transmitting apparatus 11 or the receiving apparatus 12 in the foregoing examples. The foregoing examples may be realized using computer hardware and a computer program executed thereon. FIG. 9 is a schematic view of a computer system 340. FIG. 10 is a block diagram of the computer system 340.

In FIG. 9, the computer system 340 includes a computer 341 including an FD drive and a CD-ROM drive, a keyboard 342, a mouse 343, and a monitor 344.

In FIG. 10, the computer 341 includes not only the FD drive 3411 and the CD-ROM drive 3412, but also an MPU 3413, a bus 3414 that is connected to the CD-ROM drive 3412 and the FD drive 3411, a RAM 3416 in which a command of an application program is temporarily stored and a temporary storage area is to be provided, and that is connected to a ROM 3415 in which a program such as a boot up program is to be stored, and a hard disk 3417 in which an application program, a system program, and data are to be stored. Although not shown, the computer 341 may further include a network card that provides connection to a LAN.

The program for causing the computer system 340 to execute the functions of the transmitting apparatus 11 or the receiving apparatus 12 in the foregoing examples may be stored in a CD-ROM 3501 or an FD 3502 that is inserted into the CD-ROM drive 3412 or the FD drive 3411, and be transmitted to the hard disk 3417. Alternatively, the program may be transmitted via a network (not shown) to the computer 341 and stored in the hard disk 3417. At the time of execution, the program is loaded into the RAM 3416. The program may be loaded from the CD-ROM 3501 or the FD 3502, or directly from a network.

The program does not necessarily have to include, for example, an operating system (OS) or a third party program to cause the computer 341 to execute the functions of the transmitting and receiving system and the like in the foregoing examples. The program may only include a command portion to call an appropriate function (module) in a controlled mode and obtain the desired results. The manner in which the computer system 340 operates is well known, and, thus, a detailed description thereof has been omitted.

It should be noted that, in the program, in a step of transmitting information, a step of receiving information, or the like, processing that is performed by hardware, for example, processing performed by a modem or an interface card in the transmitting step (processing that can be performed only by hardware) is not included.

Furthermore, the computer that executes this program may be a single computer, or may be multiple computers. More specifically, centralized processing may be performed, or distributed processing may be performed.

Furthermore, in the foregoing examples, it will be appreciated that two or more communication parts in one apparatus may be physically realized by one medium.

Furthermore, in the foregoing examples, each processing (each function) may be realized as centralized processing using a single apparatus (system), or may be realized as distributed processing using multiple apparatuses.

It will be appreciated that the present invention is not limited to the examples set forth herein, and various modifications are possible within the scope of the present invention.

As described above, the transmitting and receiving system according to the present invention has an effect that this system can reduce the size of data that is to be transmitted and can output high quality images at a receiving apparatus, and, thus, this system is useful as a transmitting and receiving system and the like.

The invention claimed is:

1. A transmitting apparatus, in a transmitting and receiving system provided with the transmitting apparatus that transmits an image and a receiving apparatus,
wherein the transmitting apparatus comprises:
an image accepting unit that accepts a first image;
a transmission-side correspondence table storage unit in which a transmission-side correspondence table is stored, the transmission-side correspondence table having multiple pieces of transmission-side correspondence information for associating a first image block, which is a block forming the first image, with a second image block, which is a block corresponding to the first image block and forming a second image;
a preprocessing unit that acquires one or at least two blocks from the first image accepted by the image accepting unit, acquires one or at least two second image blocks respectively corresponding to the one or at least two blocks from the transmission-side correspondence table storage unit, using the correspondence information associating the first image block with the second image block, and constructs a second image from the one or at least two second image blocks, the second image having a lower resolution than the first image, lower frame rate than the first image, or lower gradation than the first image; and
a transmitting unit that transmits the second image; and
the receiving apparatus comprises:
a receiving unit that receives the second image;
a generating unit that generates a third image from the second image received by the receiving unit, the third image having a higher resolution than the second image, higher frame rate than the second image, or higher gradation than the second image; and an output unit that outputs the third image.

2. The transmitting apparatus, in the transmitting and receiving system, according to claim 1,
wherein the transmitting apparatus further comprises an encoding unit that encodes the second image, thereby acquiring an encoded image,
the transmitting unit transmits the encoded image,
the receiving unit receives the encoded image,
the receiving apparatus further comprises a decoding unit that decodes the encoded image received by the receiving unit, thereby acquiring the second image, and
the generating unit generates a third image from the second image acquired by the decoding unit.

3. The transmitting apparatus according to claim 1, wherein the generating unit includes:
a reception-side correspondence table storage part in which a reception-side correspondence table is stored, the reception-side correspondence table having multiple pieces of reception-side correspondence information for associating the second image block, which is a block forming the second image, with a third image block, which is a block corresponding to the second image block;
a reception-side dividing part that divides the second image into one or at least two blocks, thereby acquiring one or at least two second image blocks;
a third image block acquiring part that acquires one or at least two third image blocks respectively corresponding to the one or at least two second image blocks acquired by the reception-side dividing part, from the reception-side correspondence table storage part; and
a third image constructing part that constructs a third image from the one or at least two third image blocks acquired by the third image block acquiring part.

4. The transmitting apparatus according to claim 2, wherein the generating unit includes:
a reception-side correspondence table storage part in which a reception-side correspondence table is stored, the reception-side correspondence table having multiple pieces of reception-side correspondence information for associating the second image block, which is a block forming the second image, with a third image block, which is a block corresponding to the second image block;
a reception-side dividing part that divides the second image into one or at least two blocks, thereby acquiring one or at least two second image blocks;
a third image block acquiring part that acquires one or at least two third image blocks respectively corresponding to the one or at least two second image blocks acquired by the reception-side dividing part, from the reception-side correspondence table storage part; and
a third image constructing part that constructs a third image from the one or at least two third image blocks acquired by the third image block acquiring part.

5. The transmitting apparatus according to claim 1,
wherein the preprocessing unit includes a feature amount acquiring part that acquires one or at least two feature amounts from the first image accepted by the image accepting unit,
the transmitting unit transmits the one or at least two feature amounts and either one of the second image and the encoded image,
the receiving unit receives the one or at least two feature amounts and either one of the second image and the encoded image, and the generating unit generates a third image from either one of the second image received by the receiving unit and the second image acquired by the decoding unit, using the one or at least two feature amounts.

6. The transmitting apparatus according to claim 5,
wherein one of the one or at least two feature amounts is an encoding method identifier for identifying an encoding method,
the reception-side correspondence table storage part has at least two reception-side correspondence tables for respective encoding method identifiers,
the third image block acquiring part acquires one or at least two third image blocks respectively corresponding to the one or at least two second image blocks acquired by the reception-side dividing part, from a reception-side correspondence table corresponding to the encoding method identifier.

7. The transmitting apparatus according to claim 5, wherein the feature amount acquiring part acquires one or at least two prediction coefficients, each of which is a spatiotemporal parameter, from an image forming one or at least two previous fields and a current image.

8. A receiving apparatus, in a transmitting and receiving system provided with a transmitting apparatus that transmits an image and the receiving apparatus,
wherein the transmitting apparatus comprises:
an image accepting unit that accepts a first image;
a transmission-side correspondence table storage unit in which a transmission-side correspondence table is stored, the transmission-side correspondence table having multiple pieces of transmission-side correspondence information for associating a first image block, which is a block forming the first image, with a second image block, which is a block corresponding to the first image block and forming a second image;
a preprocessing unit that acquires one or at least two blocks from the first image accepted by the image accepting unit, acquires one or at least two second image blocks respectively corresponding to the one or at least two blocks from the transmission-side correspondence table storage unit, using the correspondence information associating the first image block with the second image block, and constructs a second image from the one or at least two second image blocks, the second image having a lower resolution than the first image, lower frame rate than the first image, or lower gradation than the first image;
a transmitting unit that transmits the second image; and
the receiving apparatus comprises:
a receiving unit that receives the second image;
a generating unit that generates a third image from the second image, the third image having a higher resolution than the second image, higher frame rate than the second image, or higher gradation than the second image; and
an output unit that outputs the third image.

9. The receiving apparatus according to claim 8,
wherein the transmitting apparatus further comprises an encoding unit that encodes the second image, thereby acquiring an encoded image,
the transmitting unit transmits the encoded image,
the receiving unit receives the encoded image,
the receiving apparatus further comprises a decoding unit that decodes the encoded image received by the receiving unit, thereby acquiring the second image, and the generating unit generates a third image from the second image acquired by the decoding unit.

10. The receiving apparatus according to claim 8, wherein the generating unit includes:
   a reception-side correspondence table storage part in which a reception-side correspondence table is stored, the reception-side correspondence table having multiple pieces of reception-side correspondence information for associating the second image block, which is a block forming the second image, with a third image block, which is a block corresponding to the second image block;
   a reception-side dividing part that divides the second image into one or at least two blocks, thereby acquiring one or at least two second image blocks;
   a third image block acquiring part that acquires one or at least two third image blocks respectively corresponding to the one or at least two second image blocks acquired by the reception-side dividing part, from the reception-side correspondence table storage part; and
   a third image constructing part that constructs a third image from the one or at least two third image blocks acquired by the third image block acquiring part.

11. The receiving apparatus according to claim 9, wherein the generating unit includes:
   a reception-side correspondence table storage part in which a reception-side correspondence table is stored, the reception-side correspondence table having multiple pieces of reception-side correspondence information for associating the second image block, which is a block forming the second image, with a third image block, which is a block corresponding to the second image block;
   a reception-side dividing part that divides the second image into one or at least two blocks, thereby acquiring one or at least two second image blocks;
   a third image block acquiring part that acquires one or at least two third image blocks respectively corresponding to the one or at least two second image blocks acquired by the reception-side dividing part, from the reception-side correspondence table storage part; and
   a third image constructing part that constructs a third image from the one or at least two third image blocks acquired by the third image block acquiring part.

12. The receiving apparatus according to claim 8,
   wherein the preprocessing unit includes a feature amount acquiring part that acquires one or at least two feature amounts from the first image accepted by the image accepting unit,
   the transmitting unit transmits the one or at least two feature amounts and either one of the second image and the encoded image,
   the receiving unit receives the one or at least two feature amounts and either one of the second image and the encoded image, and
   the generating unit generates a third image from either one of the second image received by the receiving unit and the second image acquired by the decoding unit, using the one or at least two feature amounts.

13. An image transmitting and receiving method using a non-transitory computer readable storage medium in which a transmission-side correspondence table is stored, the transmission-side correspondence table having multiple pieces of transmission-side correspondence information for associating a first image block, which is a block forming a first image, with a second image block, which is a block corresponding to the first image block and forming a second image,
   the image transmitting method realized by an image accepting unit, a preprocessing unit, and a transmitting unit, comprising:
   an image accepting step of the image accepting unit accepting the first image;
   a preprocessing step of the preprocessing unit acquiring one or at least two blocks from the first image accepted in the image accepting step, acquiring one or at least two second image blocks respectively corresponding to the one or at least two blocks from the storage medium, using the correspondence information associating the first image block with the second image block, and constructing a second image from the one or at least two second image blocks, the second image having a lower resolution than the first image, lower frame rate than the first image, or lower gradation than the first image;
   a transmitting step of the transmitting unit transmitting the second image;
   receiving the second image by a receiving unit;
   generating a third image from the second image received by the receiving unit, the third image having a higher resolution than the second image, higher frame rate than the second image, or higher gradation than the second image; and
   outputting the third image.

\* \* \* \* \*